(12) United States Patent
Kelm et al.

(10) Patent No.: US 6,745,585 B2
(45) Date of Patent: Jun. 8, 2004

(54) ELECTRIC AIR CONDITIONER SUSTAIN SYSTEM

(75) Inventors: Brian Robert Kelm, Northville, MI (US); Danny Lee Berg, Novi, MI (US); Robert Joseph Mohan, Canton, MI (US); Richard Eric Luken, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 58 days.

(21) Appl. No.: 09/749,478

(22) Filed: Dec. 26, 2000

(65) Prior Publication Data

US 2002/0078700 A1 Jun. 27, 2002

(51) Int. Cl.[7] .................................. F25B 27/00
(52) U.S. Cl. ........................ 62/236; 62/133; 62/228.4; 62/323.4; 62/323.3
(58) Field of Search ................ 62/236, 133, 228.5, 62/505, 239, 243, 230, 323.4, 323.3

(56) References Cited

U.S. PATENT DOCUMENTS

| | | | |
|---|---|---|---|
| 2,251,376 A | 8/1941 | Ross | |
| 2,962,873 A | 12/1960 | Anderson | |
| 2,968,961 A | 1/1961 | McGregor | |
| 3,646,773 A | 3/1972 | Falk et al. | |
| 3,941,012 A | * 3/1976 | Mayer | .......................... 74/661 |
| 4,743,176 A | 5/1988 | Fry | |
| 4,841,736 A | 6/1989 | Suzuki | |
| 5,867,996 A | 2/1999 | Takano et al. | |
| 5,896,750 A | 4/1999 | Karl | |
| 5,934,089 A | 8/1999 | Nakagawa et al. | |
| 6,230,507 B1 | * 5/2001 | Ban et al. | .................. 62/228.4 |
| 6,287,081 B1 | * 9/2001 | Tamegai et al. | ............... 417/15 |
| 6,321,563 B1 | * 11/2001 | Ikeda et al. | .................... 62/505 |

FOREIGN PATENT DOCUMENTS

| | | |
|---|---|---|
| DE | 195 13 710 | 10/1995 |
| DE | 197 38 250 A1 | 3/1999 |
| EP | 0 978 652 A2 | 2/2000 |
| EP | 1 018 446 | 7/2000 |
| EP | 0 978 652 A3 | 10/2000 |
| JP | 04126628 | 4/1992 |
| JP | 11099824 | 4/1999 |
| JP | 2000229515 | 8/2000 |

* cited by examiner

Primary Examiner—Harry B. Tanner
(74) Attorney, Agent, or Firm—Brinks Hofer Gilson & Lione (57) ABSTRACT

An electric air conditioner sustain system is disclosed. The electric air conditioner sustain system includes a compressor, an engine and an electric motor. The engine and the electric motor selectively rotate the compressor. When the engine is rotating the compressor and the engine stops, the electric motor is synchronously activated to maintain continuous rotation of the compressor.

31 Claims, 6 Drawing Sheets

ELECTRIC AIR CONDITIONER SUSTAIN SYSTEM

BACKGROUND

1. Field of the Invention

This invention relates to air-conditioning systems, and more particularly to air-conditioning systems that include a compressor operated with an electric motor and an engine.

2. Description of the Related Art

Compressors may operate within a refrigeration system, such as an air-conditioning system, to create cooling capacity by compression of a working fluid. A compressor typically includes a pulley that is rotated by a driving force to create compression. In a vehicle, such as an automobile, an engine that also provides for movement of the vehicle may supply the driving force. Alternatively, the driving force can be supplied by an electric motor energized by a battery or other device capable of generating electrical energy.

A type of compressor known as a variable displacement compressor may be controlled to provide varying amounts of compression. The compression may be varied depending on the cooling capacity needed. Varying the amount of compression also varies the amount of driving force needed to rotate the compressor. In a non-variable displacement compressor, the compression is fixed.

In some applications, the engine or the electric motor may selectively rotate the compressor. In these applications, the driving force provided by the electric motor or the engine is sufficient to rotate the compressor. In other applications, where a variable displacement compressor is used, the electric motor may be sized to provide less than the driving force necessary to rotate the variable displacement compressor when maximum compression is desired. In this configuration, the electric motor is only activated when the driving force that is required is below a predetermined threshold and otherwise the engine provides the driving force. Upon starting the electric motor in any of the above applications, sufficient driving force must be provided by the electric motor to initiate the rotation of the compressor.

A known problem with electric motors is the potential for high inrush current when the motor is first energized from a stopped condition. The amount of inrush current is affected by the amount of starting torque, or driving force, required to initiate rotation of the electric motor. High inrush current requires the electric motor, conductors feeding the electric motor and a switch that activates and deactivates the electric motor to be sized to avoid damage due to the inrush current. In addition, an energy source supplying the electric motor is required to have sufficient capacity to supply the high inrush current. Further, the high inrush current may decrease the longevity of the supply from a battery or other similar energy source.

BRIEF SUMMARY

The present invention is defined by the following claims, and nothing in this section should be taken as a limitation on those claims. By way of introduction, the embodiments described below include a method and system for operating an air-conditioning system using an engine and an electric motor. The engine and the electric motor may be selectively activated to sustain operation of the air-conditioning system.

The operation of the air-conditioning system may be sustained by the electric motor during times when the engine is turned off. The engine and the electric motor are operable to selectively rotate a compressor in the air-conditioning system. During operation, when the engine is selected to rotate the compressor, the engine also rotates the electric motor. When the engine stops operating, the electric motor may be synchronously activated to maintain continuous rotation of the compressor thereby minimizing inrush current of the electric motor.

In an alternative embodiment, the compressor is a variable displacement compressor. In this embodiment, the engine and electric motor cooperatively operate as previously discussed. The electric motor may be sized to operate throughout the range of the variable displacement compressor. Alternatively, the electric motor may be sized to provide only enough driving force to operate the variable displacement compressor when the variable displacement compressor is not fully loaded. As such, the electric motor may only be activated when the load on the variable displacement compressor is below a predetermined amount and the engine stops. Since the electric motor is activated while the variable displacement compressor is still rotating, inrush current for the electric motor is minimized.

A method of sustaining operation of an air-conditioning system is described by one embodiment. The method comprises operating a compressor with an engine, operating the compressor with an electric motor and maintaining continuous operation of the compressor with the electric motor when the engine stops.

Another embodiment describes a method of sustaining cooling using an air-conditioning system. The method comprises rotating a compressor with an engine. The method further comprises activating an electric motor to rotate the compressor when a rotational speed of the electric motor is within a predetermined range of a rotational speed of the compressor. In addition, the method comprises disengaging the engine from the compressor.

Yet another embodiment describes a method of cooling using an air conditioner sustain system. The method comprises operating a variable displacement compressor with an electric motor, monitoring the loading of the variable displacement compressor, and adjusting an operating speed and a displacement of the variable displacement compressor to operate at an optimal efficiency point.

An electric air conditioner sustain system, where an engine operates a compressor within an air conditioner system is disclosed by another embodiment. The electric air conditioner sustain system comprises an electric motor coupled to the compressor and a controller electrically connected with the compressor and the electric motor. The controller is operable to activate the electric motor to maintain continuous operation of the compressor when the engine stops.

Further aspects and advantages of the invention are discussed below in conjunction with the preferred embodiments.

DETAILED DESCRIPTION OF THE PREFERRED EMBODIMENTS

Embodiments of an air-conditioning sustain system that includes an engine and an electric motor are disclosed. The electric motor and the engine are selectively activated to provide a driving force to maintain the operation of a compressor. The electric motor is synchronously energized in a manner that avoids high inrush current. By activating the electric motor to drive the compressor while the engine is still driving the compressor, operation of the compressor is maintained. Maintaining continuous operation of the compressor avoids the production of high startup torque by the electric motor, thereby eliminating high inrush current when the electric motor is energized.

Figure 1:
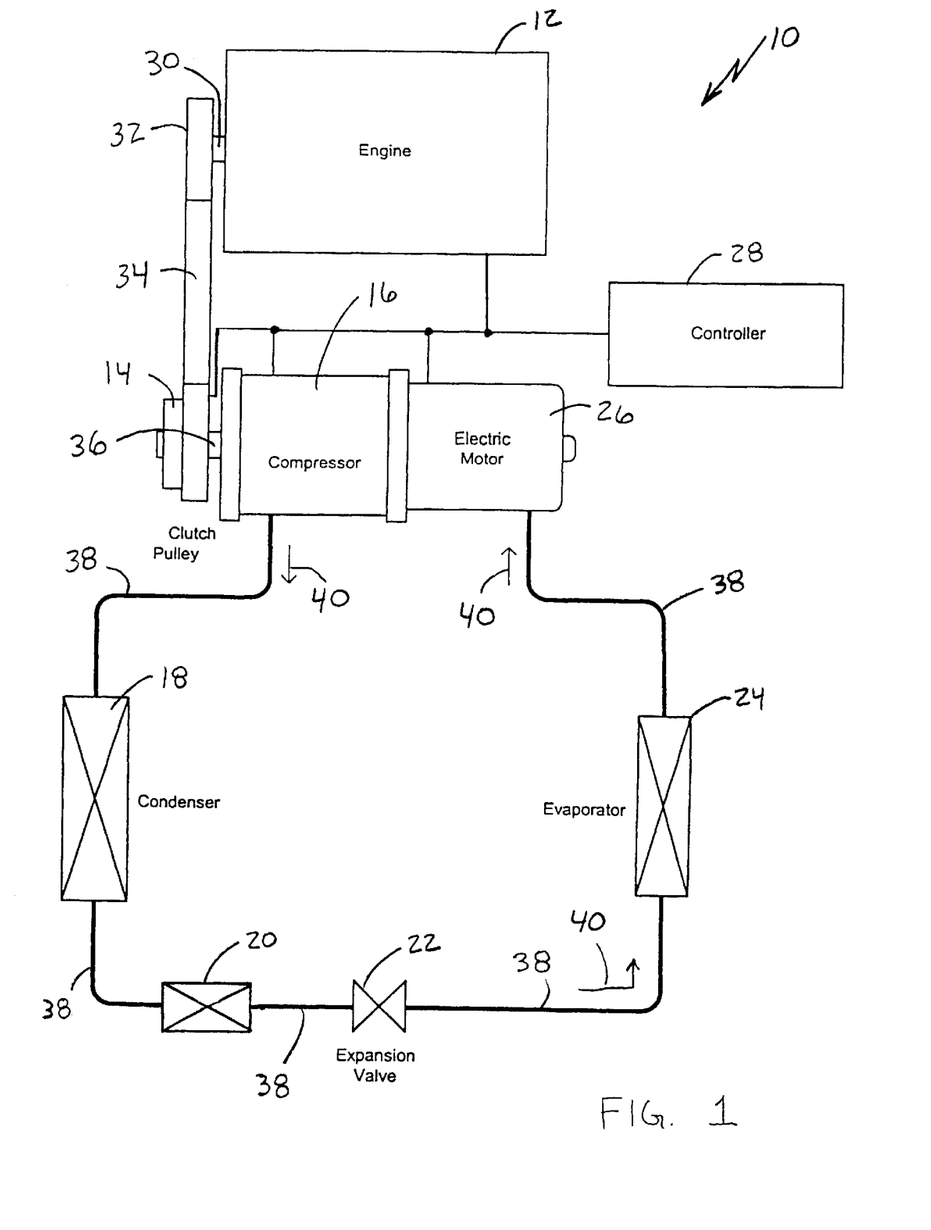
FIG. 1 is a block diagram of one embodiment of a portion of an air-conditioning system.

FIG. 1 is one embodiment of an air-conditioning system 10 that includes an engine 12, a clutch pulley 14, a compressor 16, a condenser 18, a fluid reservoir 20, an expansion valve 22, an evaporator 24, an electric motor 26 and a controller 28. The air-conditioning system 10 is not limited to cooling air and may be operated in any capacity where a source of cooling capacity is desired. In one embodiment, the air-conditioning system 10 is operated in a vehicle such as, for example, an automobile.

The engine 12 may be an internal combustion engine, a steam engine, a jet engine, an electric engine or any other device capable of converting any of various forms of energy to a driving force. In one embodiment, the engine 12 is an internal combustion engine that rotates an engine shaft 30 to provide the driving force. The engine 12 of this embodiment may be fixedly mounted, and operates to rotate an engine pulley 32 in a well-known manner. The engine pulley 32, of one embodiment, is rotatably coupled to the clutch pulley 14 by a belt 34. The belt 34 transfers the driving force to the clutch pulley 14.

The clutch pulley 14 can be any device capable of selectively transferring the driving force provided by the engine 12. An example embodiment of the clutch pulley 14 is an electromagnetic clutch pulley. One embodiment of the clutch pulley 14 rotatably cooperates with the belt 34 and is controllable to selectively transfer the driving force. The clutch pulley 14 of one embodiment includes a driving part (not shown) that can be selectively coupled with a driven part (not shown). The driving part is rotatable by the belt 34, and is capable of rotation independent of the driven part. The driven part is fixedly coupled to the compressor 16. When the clutch pulley is activated, the driven part of the clutch pulley 14 rotates with the driving part thereby rotating the compressor 16.

The compressor 16 may be any device capable of compressing a working fluid within the air-conditioning system 10. In one embodiment, the compressor 16 is fixedly mounted and includes a compressor shaft 36. The compressor shaft 36 is rotatable and is fixedly coupled with the driven part of the clutch pulley 14. During operation, the rotation of the compressor shaft 36 pressurizes a working fluid, such as a refrigerant (not shown).

In an alternative embodiment, the compressor 16 may be a variable displacement compressor 16. The variable displacement compressor 16 may be a wobble type compressor, a scroll type compressor or any other type of compressor where the displacement of the compressor may be variably controlled. The displacement determines the pressurization, or compression, supplied by the variable displacement compressor 16. When higher pressurization of the refrigerant is desired, the displacement may be adjusted to increase loading. Increased loading requires larger amounts of torque to rotate the compressor shaft 36. Higher pressurization of the refrigerant provides additional cooling capacity in the air-conditioning system 10.

The refrigerant may be circulated through the condenser 18, the reservoir 20, the expansion valve 22 and the evaporator 24 using a conduit 38. Arrows 40 illustrate circulation of the refrigerant through a portion of the air-conditioning system 10. The condenser 18, the reservoir 20, the expansion valve 22 and the evaporator 24 operate in a well-known manner to provide cooling while the compressor 16 is operating. As illustrated in FIG. 1, the refrigerant flows from the evaporator 24 to the electric motor 26.

The electric motor 26 may be any machine capable of producing a driving force when activated by a source of electric power. One embodiment of the electric motor 26 is a fixed speed DC motor operating at 42 volts DC. In alternative embodiments, the electric motor 26 may be capable of variable speed operation. The variable speed capability may result from control of the speed of the electric motor 26. Alternatively, control of a speed translation mechanism, such as, for example, a fluid coupling, that is operable to receive and translate the driving force provides the variable speed capability. The electric motor 26 may be fixedly mounted or, in an alternative embodiment, the compressor 16 and the electric motor 26 may be fixedly coupled to form an integrated compressor/motor system. In this embodiment, the compressor 16 and the electric motor 26 may be coupled by threaded connection, welding, nuts and bolts or any other mechanism capable of providing a rigid connection.

In one embodiment, the electric motor 26 includes a motor shaft (not shown) that is rotatable. The motor shaft may be fixedly coupled to the compressor shaft 36 to form a common drive shaft for the compressor 16 and the electric motor 26. In alternative embodiments, the electric motor 26 may be rotatably coupled to the compressor shaft 36 by a belt and pulley system, one or more gears or any other mechanism capable of providing rotational coupling.

The conduit 38, illustrated in FIG. 1, is fixedly coupled to the electric motor 26 by press fit, threaded connection or some other coupling mechanism. Refrigerant flowing within the conduit 38 flows through the electric motor 26 and into the compressor 16. The refrigerant provides cooling of the internal components of the electric motor 26 thereby minimizing heating during operation. The electric motor 26 may include less insulation and smaller components than a comparable electric motor without cooling. Due to the cooling, the electric motor 26 may maintain similar or improved, performance, efficiency and durability characteristics. In one embodiment, the electric motor 26 also includes thermal overload protection to protect against overheating during operation.

The amount of driving force produced by the electric motor 26 may be based on the amount of driving force required for the compressor 16. In alternative embodiments that include the variable displacement compressor 16, the electric motor 26 may be designed to produce the driving force required throughout the operating range of the variable displacement compressor 16. Alternatively, the electric motor 26 may be designed with enough driving force to rotate the compressor shaft 36 only when the variable displacement compressor 16 is operating within a predetermined range. For example, an electric motor 26 rated at 2 kilowatts is capable of driving the variable displacement compressor 16 in the displacement operating range from 0 to 2 kilowatts. The electric motor 26 is operable to produce a driving force when energized by the controller 28.

The controller 28 is operable to control the overall operation of the air-conditioning system 10. The controller 28 may be a microprocessor, an electronic control unit, a relay control unit or any other device capable of selectively operating the air-conditioning system 10. The controller 28 is electrically connected with the engine 12, the clutch pulley 14, the compressor 16 and the electric motor 26 as illustrated in FIG. 1. During operation, the controller 28 monitors a plurality of inputs and acts as the user interface for operation of the air-conditioning system 10, as will be later discussed. Based on the status of the inputs, the controller 28 is operable to control the clutch pulley 14, the compressor 16 (where the compressor 16 is a variable displacement compressor 16) and the electric motor 26. Operable control by the controller 28 is not limited to the air-conditioning system 10.

Figure 2:
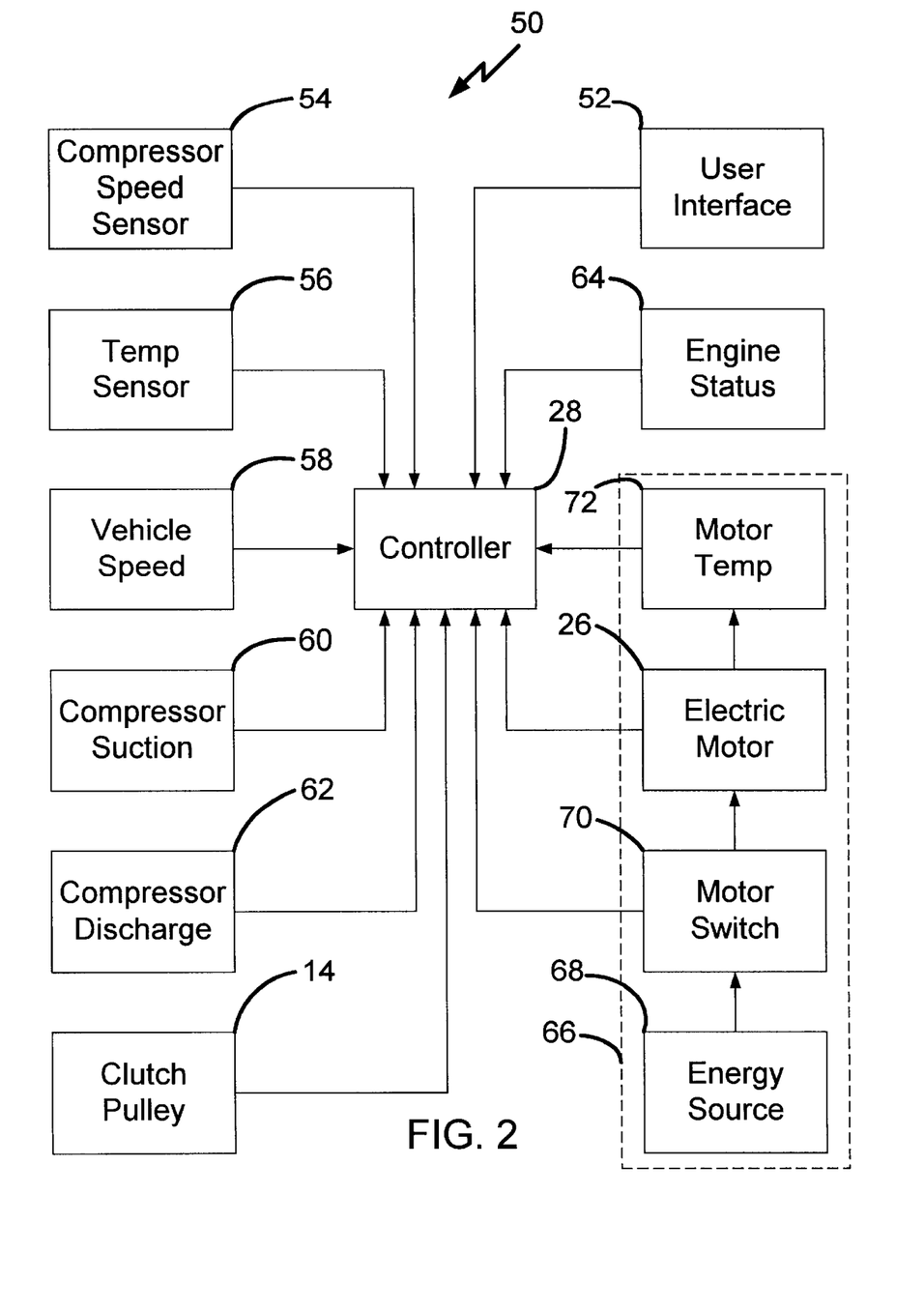
FIG. 2 is an expanded block diagram of a portion of the electrical system for the air-conditioning system depicted in FIG. 1.

FIG. 2 is a block diagram of a portion of an electrical system 50 for one embodiment of the air-conditioning system 10. The electrical system 50 includes the controller 28, the clutch pulley 14, a user interface circuit 52, a compressor speed sensor 54, a temperature sensor 56, a vehicle speed sensor 58, a compressor suction sensor 60, a compression discharge sensor 62, an engine status sensor 64 and an electric motor circuit 66 that are electrically connected as illustrated. The electric motor circuit 66 includes the electric motor 26, an energy source 68, a motor switch 70 and a motor temperature sensor 72. Additional, fewer or different components may be included.

The user interface circuit 52 may include switches, buttons, dials or any other mechanism capable of providing electrical signals to the controller 28. A user of the air-conditioning system 10 may initiate the electrical signals provided to the controller 28. In addition, the user interface circuit 52 may include indicators, gauges and other information responsive to electrical signals from the controller 28.

The sensor inputs to the controller 28 may be used to provide electrical signals to the user interface circuit 52, as well as to control operation of the air-conditioning system 10. The compressor speed sensor 54 measures the rotational speed of the compressor 16. The temperature sensor 56 may be positioned within the medium being cooled by the air-conditioning system 10, for example, within the passenger space of a vehicle. In alternative embodiments, the temperature sensor 56 may be positioned within the air-conditioning system 10. The compressor suction sensor 60 and the compression discharge sensor 62 may be positioned near the inlet and the outlet, respectively, of the compressor 16 to monitor the performance thereof. The engine status sensor 64 may indicate the operational status of the engine 12.

As further illustrated in FIG. 2, the electric motor 26 is electrically connected with the energy source 68, the motor switch 70 and the motor temperature sensor 72. In addition, the electric motor 26, the motor switch 70 and the motor temperature sensor 72 are also electrically connected with the controller 28 as illustrated. The energy source 68 may be a battery, a capacitor, a fuel cell or any other source of electrical power for the electric motor 26. The motor switch 70 may be an electromagnetic relay, a spring-loaded relay, a switching transistor or any other mechanism capable of controlling the flow of electrical energy between the electric motor 26 and the energy source 68. The motor temperature sensor 72 may be a thermocouple, an RTD or any other device capable of providing a temperature measurement. The motor temperature sensor 72 may be positioned to monitor the temperature of the electric motor 26.

Referring now to FIGS. 1 and 2, in one embodiment, the controller 28 controls the air-conditioning system 10 to selectively utilize the engine 12 and the electric motor 26 in, for example, a vehicle (not shown) operating with a start/stop operating strategy. The start/stop operating strategy operates to turn the engine 12 off when the vehicle is stopped. For example, during operating conditions when the engine 12 would otherwise be idling, the engine 12 may be turned off by the controller 28. The engine 12 may be restarted when the controller 28 receives a request to move the vehicle, such as, for example, by depression of an accelerator pedal. Start/stop operating strategies provide improved fuel economy and reduced emissions by lowering the operating hours of the engine 12. Start/stop operating strategies are not limited to vehicles and may be applied anywhere an engine 12 operates to provide a driving force on an intermittent basis.

In embodiments that include the start/stop operating strategy, the controller 28 controls the source of the driving force for the compressor 16. When the air-conditioning system 10 is activated and the engine 12 is operating, the controller 28 energizes the clutch pulley 14 to rotate the compressor 16. When the engine 12 stops, the controller 28 synchronizes the rotational speed of the compressor 16 with the speed of the electric motor 26 using a synchronization window.

Figure 3:
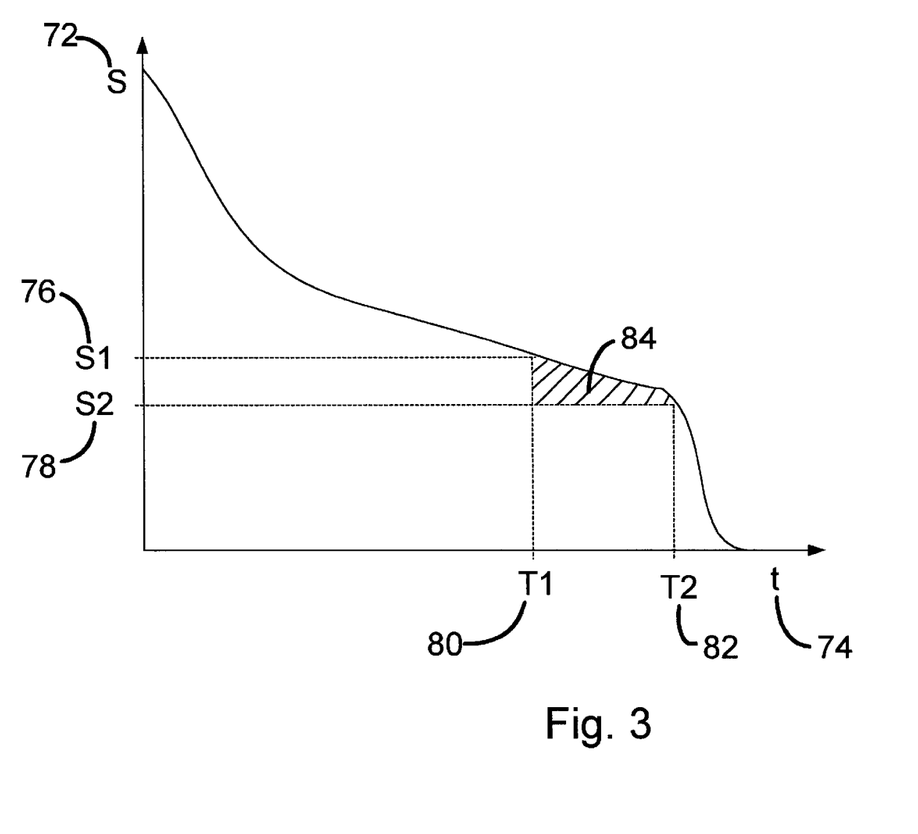
FIG. 3 is a graph illustrating a synchronization window for the air-conditioning system depicted in FIG. 1.

FIG. 3 is a graph illustrating the synchronization window for one embodiment of the air-conditioning system 10. The speed (S) 72 of the compressor 16 (FIG. 1) is shown on the Y-axis, and the X-axis represents time (t) 74. When a vehicle, or other device using the start/stop operating strategy stops at, for example, a traffic light, the engine 12 (FIG. 1) is turned off. When the engine 12 ceases rotation, the speed of the compressor 16 decreases as illustrated in FIG. 3. However, the controller 28 may maintain the speed of the compressor 16. The rotation of the compressor 16 is maintained by selectively energizing the electric motor 26.

The controller 28 may energize the electric motor 26 when the speed is between a first speed (S1) 76 and a second speed (S2) 78. The first and second speeds 76, 78, along with a first time (T1) 80 and a second time (T2) 82, form a synchronization window 84. The synchronization window 84 represents the range of speed (S) 72 of the compressor 16 that is within an acceptable range of the speed of the electric motor 26. In other words, when the speed of the compressor 16 is sufficiently synchronized with the speed of the electric motor 26.

In addition, the time from the first time (T1) 80 to the second time (T2) 82 represents a time frame for energizing the electric motor to avoid high inrush currents. The controller 28 may include the capability to determine whether the time required for energization of the electric motor 26 is within the time frame. In other words, the controller 28 may calculate the time required to energize the electric motor 26 and the rate of change of the speed of the compressor 16 to confirm the electric motor 26 may be activated within the synchronization window 84. If energization within the synchronization window 84 is not confirmed, the electric motor 26 may not be activated.

The synchronization window operating strategy may be used where the electric motor 26 is a fixed speed motor. In an alternative embodiment, the electric motor 26 may be capable of variable speed operation. In this embodiment, the speed of the electric motor 26 may be adjusted to effectively shift the synchronization window 84. The speed of the compressor 16 may fall within the shifted synchronization window 84 thereby sufficiently synchronizing the speed of the compressor 16 and the speed of the electric motor 26. Adjustment of the speed may occur prior to energization of the electric motor 26 to achieve a speed, upon energization, within an acceptable range of the speed of the compressor 16.

Referring again to FIGS. 1 and 2, in addition to energization of the electric motor 26, the controller may also deenergize the clutch pulley 14, thereby disengaging the engine 12 from the compressor 16. The controller 28 controls the activation of the electric motor 26 and the deenergization of the clutch pulley 14 to maintain the rotation of the compressor 16 as the engine 12 stops rotating. Since the electric motor 26 may be energized while the compressor 16 is still rotating, the electric motor 26 takes advantage of the angular momentum of the rotating compressor 16. In this way, the electric motor 26 is not required to supply the relatively high startup torque that would otherwise be required to start the compressor 16 from a stopped condition.

Since the electric motor 26 is not subject to high startup torque, the inrush current of the electric motor 26 remains relatively low. With relatively low inrush current, the windings of the electric motor 26, the motor switch 70 and the interconnecting conductors may be designed with less current carrying capability. In addition, the longevity of the energy source 68 is improved due to the lower overall power demand of the electric motor 26.

In an alternative embodiment, the compressor 16 comprises a variable displacement compressor 16. In this alternative embodiment, the electric motor 26 produces only enough driving force to rotate the compressor shaft 36 when the variable displacement compressor 16 is lightly loaded. The loading of the variable displacement compressor 16 may be determined based on a displacement sensor. The displacement sensor may measure the amount of displacement of the variable displacement compressor 16. Alternatively, the displacement sensor may be the temperature sensor 56, the compressor suction and discharge sensors 60, 62, or other similar system operating parameters that may be used to determine the loading of the variable displacement compressor 16. The controller 28 may monitor the displacement sensor.

The electric motor 26 of this alternative embodiment is only energized when the loading of the variable displacement compressor 16 is within a predetermined range and the speed (S) 72 (FIG. 3) is within the synchronization window 84 (FIG. 3). Further, once the electric motor 26 is operating, the loading on the variable displacement compressor 16 may be maintained within the predetermined range. Alternatively, the electric motor 26 may be deenergized when the loading on the variable displacement compressor 16 goes outside the predetermined range. In yet another alternative, operation of the electric motor 26 may be based on a predetermined threshold value of loading instead of the predetermined range previously discussed.

In one embodiment, the controller 28 may control the loading of the variable displacement compressor 16. In alternative embodiments, the loading of the variable displacement compressor 16 may be performed by a relay, a temperature controller or any other device capable of providing a variable signal to the variable displacement compressor 16. Control of the loading, or displacement, of the variable displacement compressor 16 may be based on a loading parameter. The loading parameter may be, for example, an electrical signal from the user interface circuit 52, the temperature sensor 56 or any other operational parameter(s) available in the air-conditioning system 10. In an alternative embodiment, the controller 28 determines the loading parameter based on logical analysis of a plurality of inputs provided to the controller 28, such as, for example, engine speed, cooling demand and/or other similar parameters.

The controller 28 of one embodiment may also protect the electric motor 26. The protection of the electric motor 26 may be based on thermal overload type protection. The controller 28 monitors the motor temperature sensor 72. If the temperature of the electric motor 26 exceeds a predetermined value, the controller 28 may deactivate the electric motor 26. In addition, where the compressor 16 comprises the variable displacement compressor 16, the controller 28 may adjust the displacement of the variable displacement compressor 16 to provide additional cooling to the electric motor 26. In alternative embodiments, the controller 28 may also perform other protective functions such as, for example, monitoring the energy source 68 for low power conditions.

In yet another embodiment, the controller 28 performs similar synchronization of the engine 12 with the electric motor 26. In this embodiment, the controller 28 switches from the driving force supplied by the electric motor 26 to the driving force supplied by the engine 12. The controller 28 of this embodiment monitors the engine status sensor 64 for operation of the engine 12. When the engine 12 begins operation, the rotational speed of the clutch pulley 14 and the rotational speed of the compressor 16 are monitored by the controller 28. The synchronization window 84 (FIG. 3) is used to determine when the switch can be accomplished. The controller 28 controls the timing of the deenergization of the electric motor 26 and synchronous engagement of the compressor 16 with the engine 12 similar to the previously discussed embodiments.

The air-conditioning system 10 of another embodiment includes the compressor 16 that comprises a variable displacement compressor 16 and an electric motor 26 capable of variable speed operation. The controller 28 of this embodiment includes at least one efficiency map (not shown) for the variable displacement compressor 16. In alternative embodiments, the efficiency map may be included in a separate device, such as, for example, a memory storage device in communication with the controller 28.

The efficiency map may be used to maximize efficiency of the air-conditioning system 10 when the electric motor 26 is driving the variable displacement compressor 16. The efficiency map may represent a series of efficiency curves for the variable displacement compressor 16. The efficiency curves may be developed through testing based on the displacement, speed and loading of the variable displacement compressor 16. The loading (i.e. the torque requirement) of the variable displacement compressor 16 is a function of the cooling capacity required. The speed and the displacement may be cooperatively varied to achieve a desired loading. For example, the same loading may be achieved with a relatively low speed and relatively high displacement as with a relatively high speed and a relatively low displacement. As such, the optimal speed and displacement to achieve a desired load may be based on maximizing efficiency.

Optimal efficiency may be based on the power consumption of the electric motor 26, the efficient operation of the variable displacement compressor 16 or a combination of both. In alternative embodiments, additional efficiency related considerations within the air-conditioning system 10 may also be included in determining the optimal efficiency. By varying both the speed and the displacement of the variable displacement compressor 16, at least one optimal efficiency point may be identified for any given loading. An optimal efficiency point is an operating situation where the desired loading is achieved, and the air conditioning system 10 is operating at optimal efficiency.

During operation, following energization of the electric motor 26, the efficiency map is used to adjust the speed of the electric motor 26 and the displacement of the variable displacement compressor 16. As in the previously discussed embodiments, the electric motor 26 is synchronously energized to maintain the rotation of the variable displacement compressor 16. If the electric motor 26 is sized to operate the variable displacement compressor 16 in a predetermined range, the efficiency map may be used to optimize efficiency within that predetermined range.

Figure 4:
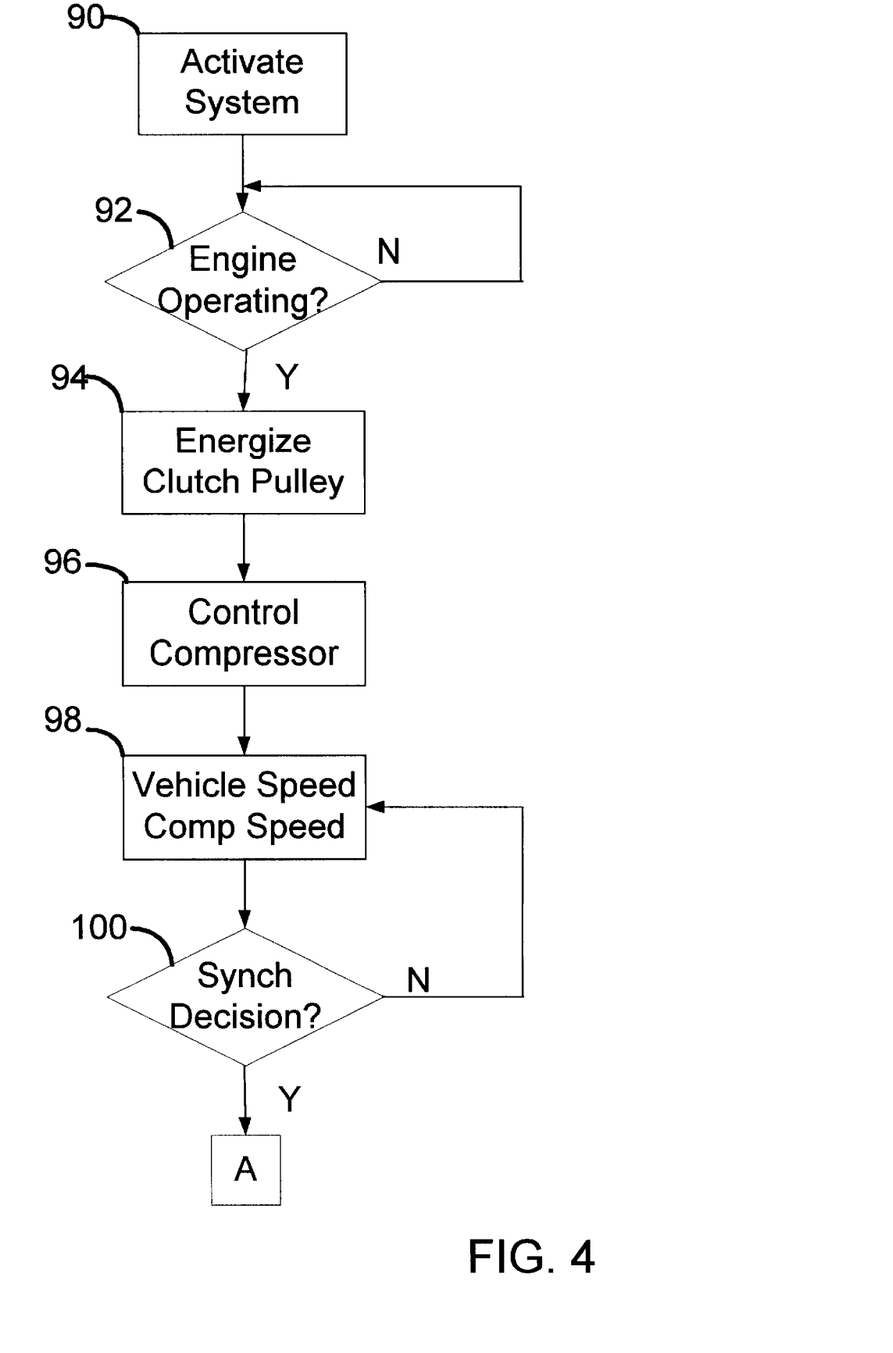
FIG. 4 is a first part of a flow diagram illustrating operation of the air-conditioning system depicted in FIG. 1.
Figure 5:
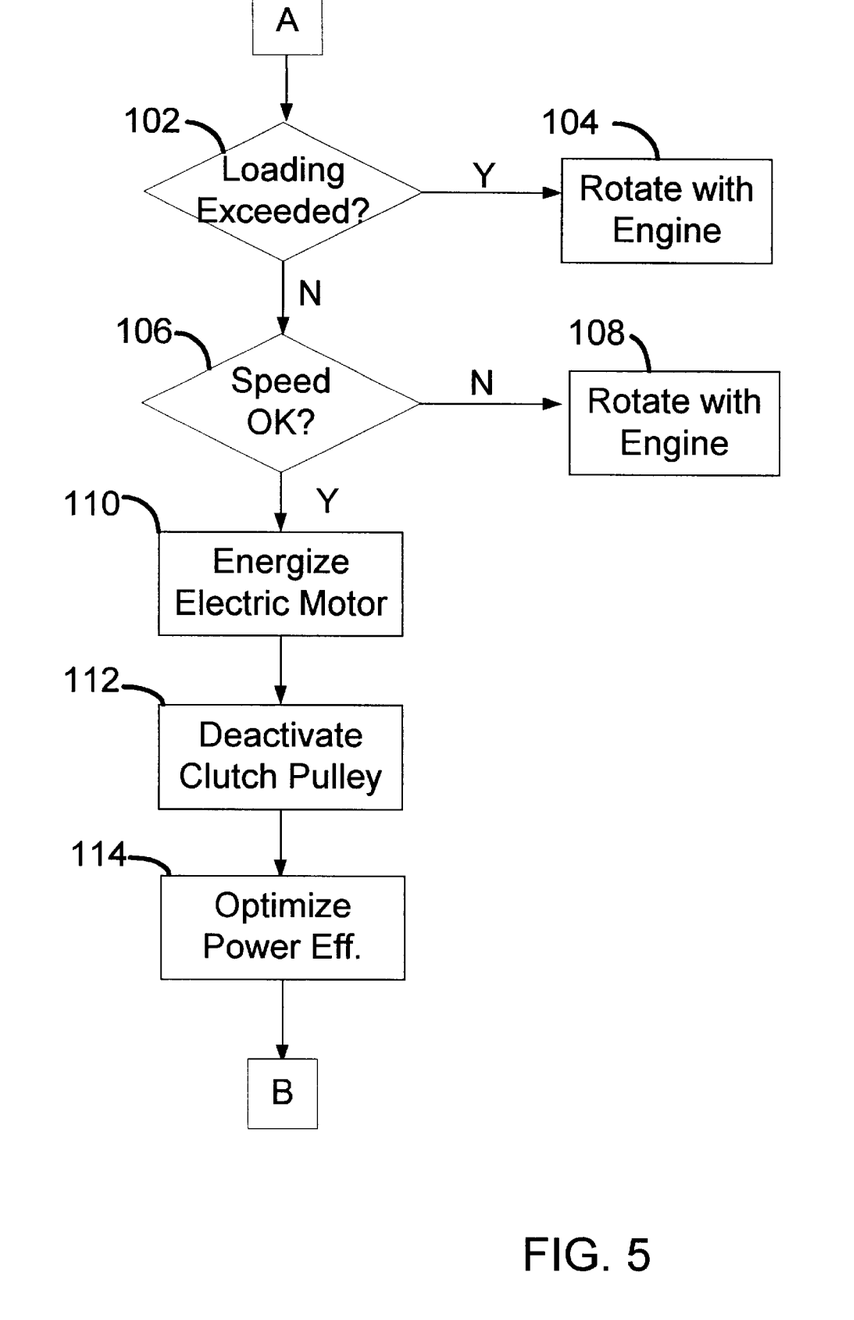
FIG. 5 is a second part of the flow diagram illustrating operation of the air-conditioning system depicted in FIG. 1.
Figure 6:
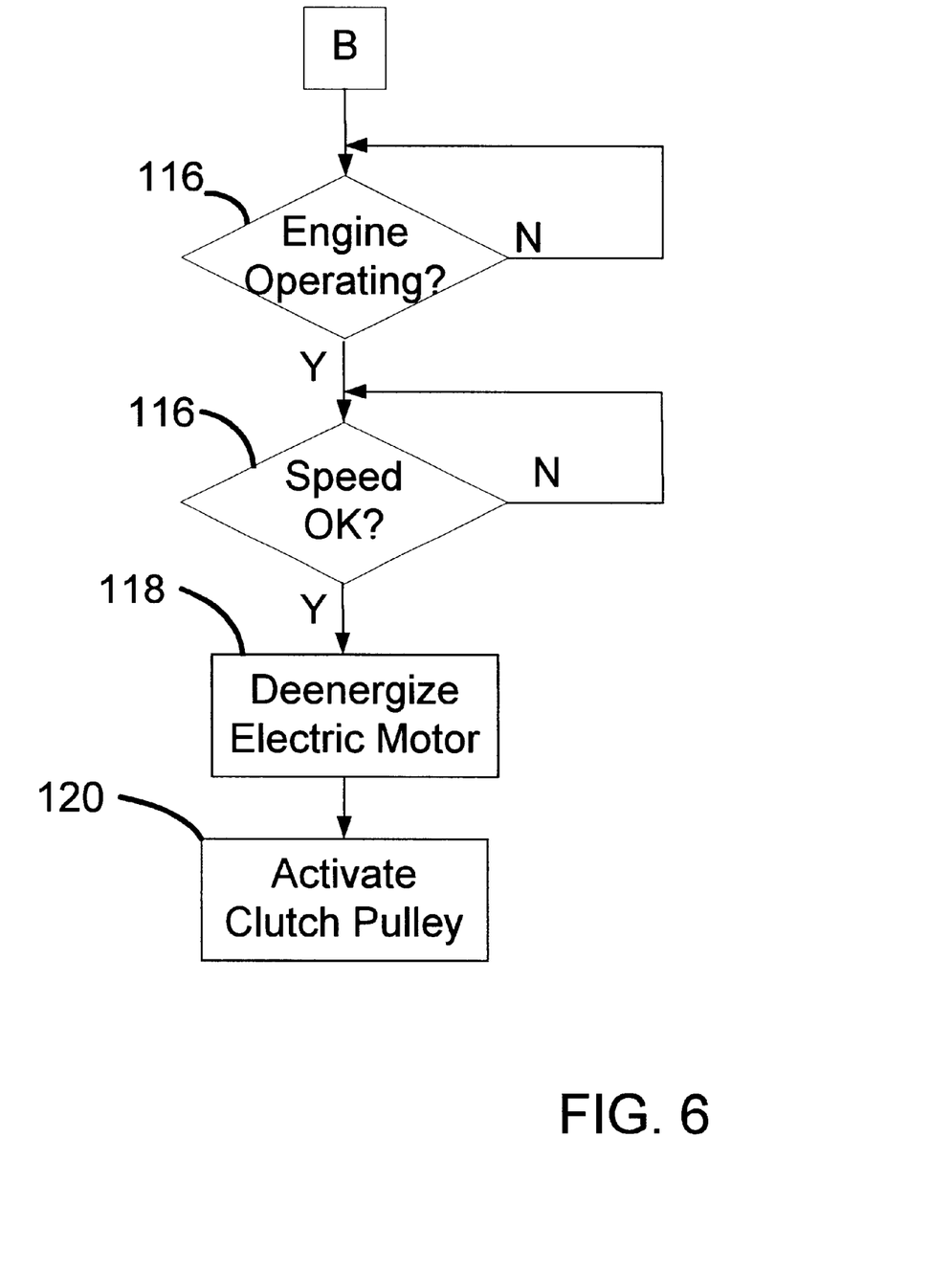
FIG. 6 is a third part of the flow diagram illustrating operation of the air-conditioning system depicted in FIG. 1.

FIG. 4 is a block diagram illustrating operation of an embodiment of the air-conditioning system 10. The operation now described includes reference to the air-conditioning system 10 previously discussed with reference to FIGS. 1, 2 and 3. The operation is discussed with reference to a variable displacement compressor 16; however, a non-variable compressor could alternatively be used with slight modification to the operation. Further, the electric motor 26 discussed in the operation provides a driving force that cannot operate the variable displacement compressor 16 under full load; however, an electric motor with full load driving force capabilities could be used with slight modifications to the operation described.

Operation of the air-conditioning system 10 begins at block 90 when a user activates the system. At block 92, the controller 28 determines if the engine 12 is operating using the engine status sensor 64. If the engine 12 is not operating, the controller 28 continuously monitors for the engine 12 to begin operation. If, or once, the engine 12 is operating, the controller 28 energizes the clutch pulley 14 at block 94. Energization of the clutch pulley 14 transfers the driving force from the engine 12 to the variable displacement compressor 16. At block 96, the loading parameter is used to control the displacement of the variable displacement compressor 16.

At block 98, the controller 28 monitors the speed of the variable displacement compressor 16 and the vehicle speed using the compressor speed sensor 54 and the vehicle speed sensor 58, respectively. Based on the vehicle speed and the speed of the variable displacement compressor 16, the controller 28 makes an initial synchronizing decision at block 100. The initial synchronizing decision is based on a determination that the vehicle is stopping and that the engine 12 is in the process of being turned off, such as, for example, in a start/stop operating strategy.

Once the synchronizing decision is initiated, the amount of loading on the variable displacement compressor 16 is determined at block 102 using the displacement sensor. If the loading (i.e. the torque requirement) is too high for the electric motor 26, the variable displacement compressor 16 remains rotationally coupled with the engine 12 at block 104. If the loading does not exceed the driving force available from the electric motor 26, the rotational speed of the variable displacement compressor is monitored at block 106.

If the speed is not within the synchronization window 84, the variable displacement compressor 16 remains rotationally coupled with the engine 12 at block 108. Where the electric motor 26 includes variable speed capability, the speed of the electric motor 26 may be adjusted to move the synchronization window 84. When the speed of the variable displacement compressor 16 is within the synchronization window 84, the electric motor 26 is energized at block 110. At block 112, the clutch pulley 14 is deactivated so that the variable displacement compressor 16 is rotationally coupled with the electric motor 26. At block 114, the speed and displacement are adjusted based on the loading to optimize efficiency.

When the vehicle or engine 12 is commanded to start or move, the controller 28 senses that the engine 12 is operating at block 116. At block 118, the controller 28 monitors the rotational speed of the clutch pulley 14 and the variable displacement compressor 16 to determine if the speed of the clutch pulley 14 is within the synchronization window 84. When the speed is within the synchronization window 84, the controller 28 deenergizes the electric motor 26 at block 120. At block 122, the clutch pulley 14 is activated thereby rotationally coupling the variable displacement compressor 16 with the engine 12. Deenergization of the electric motor 26 and activation of the clutch pulley 14 may occur while the variable displacement compressor 16 continues to rotate.

The embodiments of the air-conditioning system 10 herein described provide a low cost, durable solution that selectively sustains cool temperatures using the engine 12 and the electric motor 26. Through cooperative operation of the engine 12 and the electric motor 26, the electric motor 26 may be operated with a substantially smaller range of power requirements than conventional electric motors due to minimization of the inrush current. In addition, the cooling of the electric motor 26 with the refrigerant reduces the need for temperature related design considerations of the internal components of the electric motor 26. As such, the electric motor 26 and associated circuitry may be advantageously configured with lower current carrying capacity components that may be lighter weight and less expensive while achieving operating performance that may be equal to or better than conventional electric motors.

While the invention has been described above by reference to various embodiments, it will be understood that many changes and modifications can be made without departing from the scope of the invention. For example, the air-conditioning system 10 may be used in applications such as refrigeration devices, airplanes, trains, buildings and any other purpose where sustained cooling is desired with alternative sources of driving force. It is therefore intended that the foregoing detailed description be understood as an illustration of the presently preferred embodiments of the invention, and not as a definition of the invention. It is only the following claims, including all equivalents that are intended to define the scope of this invention.

What is claimed is:

1. A method of sustaining operation of an air-conditioning system, the method comprising:
    operating a compressor with an engine;
    operating the compressor with an electric motor;
    energizing the electric motor when a rotational speed of the compressor is in a predetermined range that is determined with a synchronization window; and
    maintaining continuous operation of the compressor with the electric motor when the engine stops.

2. The method of claim 1, further comprising varying a rotational speed of the electric motor to be within the predetermined range of the rotational speed of the compressor prior to energization.

3. The method of claim 1, further comprising operating the electric motor at a constant speed.

4. The method of claim 1, further comprising circulating a refrigerant through the electric motor.

5. The method of claim 1, further comprising disengaging the engine from the compressor with a clutch pulley when the engine stops.

6. The method of claim 1, wherein the compressor is a variable displacement compressor and the method further comprises operating the variable displacement compressor with the electric motor when the displacement is within a predetermined range.

7. The method of claim 1, wherein energizing the electric motor comprises considering the time required to energize the electric motor and the rate of change of the rotational speed of the compressor to determine if the electric motor can be energized within the synchronization window.

8. The method of claim 1, wherein energizing the electric motor comprises determining the synchronization window based on a range of the rotational speed of the compressor where inrush current supplied to the electric motor will be less than a predetermined magnitude upon energization of the electric motor.

9. A method of sustaining cooling using an air-conditioning system, the method comprising:
rotating a compressor with an engine;
determining a synchronization window based on a range of a rotational speed of the compressor and a range of time that an electric motor may be energized with minimized inrush current to the electric motor, wherein the electric motor is configured to rotate the compressor;
timing energization of the electric motor to be within the synchronization window based on the time required to energize the electric motor and a rate of change of the rotational speed of the compressor;
energizing the electric motor within the synchronization window to rotate the compressor, wherein the synchronization window defines when the rotational speed of the energized electric motor will be within a predetermined range of the rotational speed of the compressor; and
disengaging the engine from the compressor.

10. The method of claim 9, further comprising adjusting the rotational speed of the electric motor to be within the synchronization window.

11. The method of claim 9, further comprising: deenergizing the electric motor; and engaging the compressor with the engine to maintain rotation of the compressor.

12. The method of claim 11, further comprising:
determining a synchronization window based on a rotational speed of the engine and a rotational speed of the compressor; and
deenergizing the electric motor within the synchronization window; and
engaging the engine with the compressor within the synchronization window to maintain rotation.

13. The method of claim 9, wherein the compressor is a variable displacement compressor and the method further comprises varying the loading of the variable displacement compressor.

14. The method of claim 13, wherein energization of the electric motor occurs only when loading of the variable displacement compressor is less than a predetermined threshold value of loading.

15. The method of claim 14, further comprising adjusting the displacement of the variable displacement compressor in a range that is less than the predetermined threshold value of loading during operation of the electric motor.

16. The method of claim 13, further comprising adjusting the speed of the electric motor and the displacement of the variable displacement compressor to maximize efficiency.

17. An electric air conditioner sustain system, wherein an engine operates a compressor within an air conditioner system, the electric air conditioner sustain system comprising:
an electric motor coupled to the compressor; and
a controller electrically connected with the compressor and the electric motor, wherein the controller is operable to activate the electric motor within a synchronization window to maintain continuous operation of the compressor when the engine stops,
wherein the controller is operable to determine whether the electric motor can be activated within the synchronization window based on a rate of change of a rotational speed of the compressor and a time period to energize the electric motor so that the rotational speed of the electric motor upon activation will be substantially synchronized with the rotational speed of the compressor.

18. The electric air conditioner sustain system of claim 17, wherein the compressor is operable to compress a working fluid that is channeled through the electric motor.

19. The electric air conditioner sustain system of claim 17, wherein the electric motor and the compressor rotate with a common drive shaft.

20. The electric air conditioner sustain system of claim 17, further comprising a clutch pulley rotatably coupled to the compressor and the engine, wherein the clutch pulley is operable to disengage the compressor from the engine.

21. The electric air conditioner sustain system of claim 17, wherein the electric air conditioner sustain system is operated in a vehicle.

22. The electric air conditioner sustain system of claim 21, wherein the vehicle is operated with a start/stop operating strategy.

23. The electric air conditioner sustain system of claim 17, wherein the compressor is a variable displacement compressor.

24. The electric air conditioner sustain system of claim 23, further comprising a displacement sensor electrically connected with the controller operable to determine loading of the variable displacement compressor, wherein the electric motor is only activated by the controller when the engine stops and the loading is within a predetermined range.

25. The electric air conditioner sustain system of claim 17, wherein the synchronization window comprises a range of the rotational speed of the compressor where the compressor is substantially synchronized with the rotational speed of the electric motor.

26. A method of sustaining operation of an air-conditioning system, the method comprising:
selectively rotating a compressor with an engine and an electric motor;
rotating the compressor with the engine;
during rotation of the compressor with the engine, determining a synchronization window based on the rate of change of a rotational speed of the compressor and a rotational speed of the electric motor upon energization of the electric motor;
adjusting the synchronization window by adjustment of a rotational speed control of the electric motor prior to energization of the electric motor; and energizing the electric motor within the synchronization window to substantially synchronize the rotational speed of the electric motor with the rotational speed of the compressor upon activation of the electric motor.

27. The method of claim 26, wherein energizing the electric motor within the synchronization window comprises considering the time period to energize the electric motor prior to energization to determine whether the electric motor will be energized within the synchronization window.

28. The method of claim 26, further comprising deactivating a clutch pulley to stop rotation of the compressor by the engine after the electric motor is energized.

29. The method of claim 26, wherein determining a synchronization window comprises determining a first rotational speed of the compressor and a second rotational speed of the compressor that form a range and determining a first energization time and a second energization time that form a time period for energization of the electric motor that minimizes inrush current.

30. The method of claim 26, wherein the compressor comprises a variable displacement compressor, the method further comprising adjusting the rotational speed control of the electric motor and the variable displacement compressor to maximize efficiency.

31. The method of claim 26, wherein the electric motor is a variable speed electric motor.

* * * * *